UNITED STATES PATENT OFFICE.

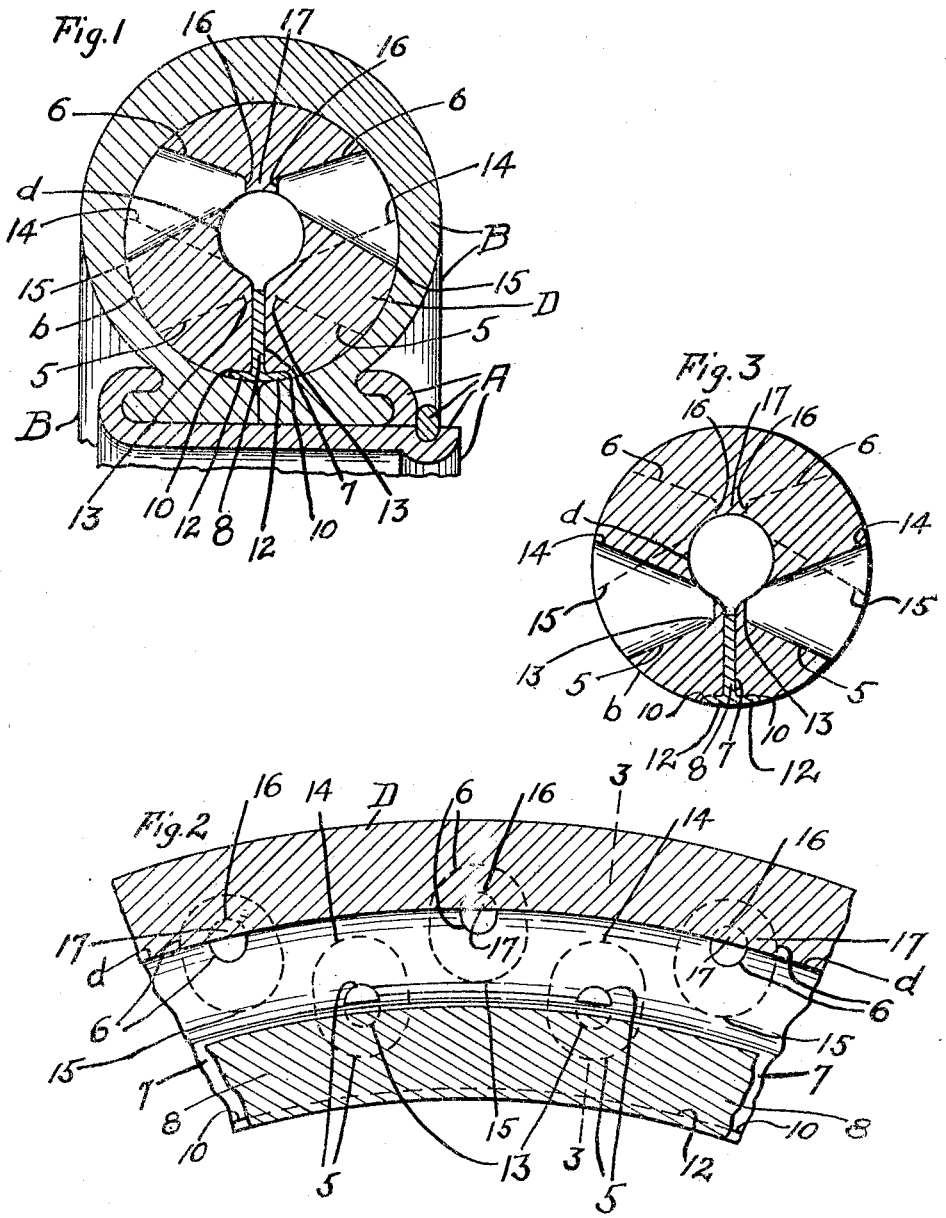

GEORGE E. GILMORE, OF CLEVELAND, AND FREDERICK V. ROESEL, OF AKRON, OHIO.

CORE FOR RESILIENT WHEEL-TIRES.

1,227,422.   Specification of Letters Patent.   Patented May 22, 1917.

Application filed January 22, 1917. Serial No. 143,634.

*To all whom it may concern:*

Be it known that we, GEORGE E. GILMORE, a citizen of the United States of America, residing at Cleveland, in the county of Cuyahoga and State of Ohio, and FREDERICK V. ROESEL, a citizen of the United States of America, residing at Akron, in the county of Summit and State of Ohio, have invented a certain new and useful Improvement in Cores for Resilient Wheel-Tires; and we do hereby declare the following to be a full, clear, and exact description of the invention, such as will enable others skilled in the art to which it pertains to make, and use the same.

This invention relates to improvements in cores for resilient wheel-tires, and pertains more especially to a tubular core which embodies an improvement of the core disclosed and claimed in United States Letters Patent, No. 1,183,121, granted May 16, 1916, and therefore comprises an elastic and compressible non-inflatable tubular body which has a central chamber and is provided in each side thereof with recesses.

The primary object of this invention is to render an elastic and compressible and non-inflatable tubular tire-core highly resilient and adequately strong and durable in every portion thereof and adapted to snugly fit the casing of a tire comprising said core.

With this object in view, and to attain any other object hereinafter appearing, this invention consists in certain peculiarities in the construction and contour of the core in cross-section, hereinafter described in this specification, pointed out in the claims, and illustrated in the accompanying drawings.

In said drawings, Figure 1 is a cross-sectional view of a tire provided with a core embodying our invention and shows the tire applied to a tire-holder. Fig. 2 is a longitudinal section of a portion of said core. Fig. 3 is a transverse section on line 3—3, Fig. 2.

Referring to said drawings, A, Fig. 1, indicates the rim of a wheel and B indicates the hollow casing of a tire. Said casing is substantially the same as the casing of an ordinary pneumatic tire and consequently composed of flexible and elastic material, such, for instance, as rubber. Said casing extends therefore circumferentially of the rim A and is provided interiorly with a chamber *b* extending circumferentially of said rim. Within said chamber is our improved flexible core which comprises an elastic and compressible non-inflatable tubular body D which extends circumferentially of the rim and is separately illustrated in Figs. 2 and 3. The body D is composed of elastic and compressible material such, for instance, as rubber, and *d* indicates the chamber formed centrally of said body and extending circumferentially of and arranged concentrically relative to the axis of the core. The walls of the chamber *d* are thick enough to positively prevent the core from collapsing in a tire applied to a vehicle-rim, as shown in Fig. 1, by undue pressure on the tire.

The body D is provided in each side thereof with two rows of laterally extending substantially horizontally arranged recesses, which rows are spaced radially of said side, and each recess extends to the exterior of the core, and 5 indicates the recesses of the inner of said rows and 6 indicates the recesses of the outer of said rows. Each recess 5 of the inner row of recesses in each side of the core is substantially in line endwise with a recess of the inner row of recesses in the other side of the core. Each recess 6 of the outer row of recesses in each side of the core is substantially in line endwise with a recess in the outer row of recesses in the other side of the core. The recesses of each row of recesses in each side of the core alternate with the recesses of the other row of recesses in said side of the core. Said recesses flare toward the exterior of the core.

To facilitate the manufacture of the core and afford access to its chamber *d* for cleaning and repairs, the core is provided in the inner half or portion of its body D with a slot 7 which is arranged between the inner rows of recesses and extends from said chamber to the exterior of the core. The slot 7 is engaged by an imperforate strip 8 of elastic and compressible material such, for instance, as rubber. The strip 8 holds apart and braces the side walls of the slot 7 and constitutes means for holding the slotted portion of the core tightly against the casing B containing the core. The slot 7 is enlarged laterally, as at 10, at the exterior of the core, in opposite directions, and the strip 8 has flanges 12 which engage the enlargements 10 of the slot so as to prevent displacement of said strip into the chamber *d*.

To give the core a high degree of resiliency at the inner portion of the slot 7 each recess of the inner row of recesses in each side of the core has its inner end arranged, as at 13, nearer the exterior of the core than the inner edge of said slot, but said recesses are spaced from said slot so as to avoid interference with adequate strength of the core at the sides of the slot.

To render the core more especially highly resilient at each side of the chamber $d$ the two rows of recesses in each side of the core have such relative arrangement that the outer end-portion of each recess of the inner row of recesses in said side of the core extends, as at 14, into the outer half of the core and the outer end-portion of each recess of the outer row of recesses in said side of the core extends, as at 15, into the inner half of the core.

To further improve the resiliency of the outer half of the core, more especially circumferentially of the chamber $d$, the inner end of each outer recess 6 is arranged, as at 16, nearer the outer circumference of the core than the chamber $d$. To render the core strong and durable enough circumferentially of the chamber $d$ the body of the core has an imperforate portion extending circumferentially of said chamber and, as at 17, between the inner end of each outer recess 6 in one side of the core and the opposite outer recess in the other side of the core, and said imperforate portion of said body forms end walls for portions of said recesses and is arranged diametrically opposite the slot 7 in the inner half of the core.

A tire-core having the peculiarities hereinbefore described is highly resilient and adequately strong and durable in every portion thereof.

What we claim is:—

1. A flexible and resilient tire-core comprising an elastic and compressible non-inflatable body having a central chamber and provided in each side thereof with an outer row and an inner row of laterally extending recesses arranged substantially horizontally between said chamber and the exterior of the core, the outer end-portion of each recess of the inner row of recesses in each side of the core extending into the outer half of the core, and the outer end-portion of each recess of the outer row of recesses in each side of the core extending into the inner half of the core.

2. A flexible and resilient tire-core comprising an elastic and compressible non-inflatable body having a central chamber and provided in each side thereof with an outer row and an inner row of laterally extending recesses arranged substantially horizontally between said chamber and the exterior of the core, each recess in each side of the core being arranged in line endwise with a recess in the opposite side of the core, the inner ends of the recesses of the outer row of recesses in each side of the core being arranged nearer the outer circumference of the core than the aforesaid chamber, and the body of the core having an imperforate portion which is arranged between the inner end of each outer recess in one side of the core and the opposite outer recess in the other side of the core and which forms end walls for portions of said recesses.

3. A flexible and resilient tire-core comprising an elastic and compressible non-inflatable body having a central chamber and provided in each side thereof with an outer row and an inner row of laterally extending recesses arranged substantially horizontally between said chamber and the exterior of the core, the recesses of the outer row of recesses in each side of the core extending at their outer ends into the inner half of the core and having their inner ends arranged nearer the outer circumference of the core than the aforesaid chamber.

4. A flexible and resilient tire-core comprising an elastic and compressible non-inflatable body having a central chamber and provided in each side thereof with an outer row and an inner row of laterally extending recesses arranged substantially horizontally between said chamber and the exterior of the core, said body having an imperforate portion extending circumferentially of said chamber between the outer rows of recesses and being provided with a slot which is arranged diametrically opposite said imperforate portion and extends along the aforesaid chamber and from said chamber to the exterior of the core, said slot being adapted to receive means for holding apart and bracing the side walls of said slot.

5. A flexible and resilient tire-core comprising an elastic and compressible non-inflatable body having a central chamber and provided in each side thereof with an outer row and an inner row of laterally extending recesses arranged substantially horizontally between said chamber and the exterior of the core, the inner ends of the recesses of the outer row of recesses in each side of the core being arranged nearer the outer circumference of the core than the aforesaid chamber, the aforesaid body having an imperforate portion which extends circumferentially of said chamber between the outer rows of recesses and provided with a slot which is arranged diametrically opposite said imperforate portion and extends along the aforesaid chamber and from said chamber to the exterior of the core and is adapted to receive means for holding apart and bracing the side walls of the slot, and the inner ends of the recesses of the inner row of recesses in each side of the core being arranged nearer the exterior of the core than the inner edge of said slot.

6. A flexible and resilient tire-core comprising an elastic and compressible non-inflatable body having a central chamber and provided in each side thereof with an outer row and an inner row of laterally extending recesses arranged substantially horizontally between said chamber and the exterior of the core, said body having an imperforate portion extending circumferentially of said chamber between the outer rows of recesses and being provided with a slot which is arranged diametrically opposite said imperforate portion and extends along the aforesaid chamber and from said chamber to the exterior of the core and which has a lateral enlargement at the exterior of the core, and an elastic and compressible strip engaging said slot and flanged into said enlargement of the slot.

7. A flexible and resilient tire-core comprising an elastic and compressible non-inflatable body having a central chamber and provided in each side thereof with an outer row and an inner row of laterally extending recesses arranged substantially horizontally between said chamber and the exterior of the core, the core being provided in the inner half of its body with a slot which is arranged between the inner rows of recesses and extends from said chamber to the exterior of the core and along said chamber, and an elastic and compressible strip engaging said slot, each recess of the inner row of recesses in each side of the core having its inner end arranged nearer the exterior of the core than the inner edge of said slot, and the last-mentioned recesses being spaced from said slot.

In testimony whereof, we sign the foregoing specification, in the presence of two witnesses.

GEORGE E. GILMORE.
FREDERICK V. ROESEL.

Witnesses:
CASPER J. DORER,
B. C. BROWN.